United States Patent Office 3,546,174
Patented Dec. 8, 1970

3,546,174
DIGUANAMINE-ALDEHYDE CONDENSATION
PRODUCTS
Robert K. Grasselli, Cleveland, and James L. Callahan,
Bedford Heights, Ohio, assignors to The Standard Oil
Company, Cleveland, Ohio, a corporation of Ohio
No Drawing. Continuation of application Ser. No.
588,665, Sept. 30, 1966. This application July 22,
1969, Ser. No. 843,854
Int. Cl. C08g 9/28, 9/30
U.S. Cl. 260—67.6         1 Claim

ABSTRACT OF THE DISCLOSURE

Novel diguanamines are formed from aromatic dinitriles and a process for their preparation is disclosed. A typical diguanamine is 1,4-bis-[2,6-diamino-s-triazinyl]-1-phenyl-1,2,3,4-tetrahydronaphthalene, more commonly referred to as atroponitrile dimer diguanamine, which is particularly useful in imparting stain resistance to articles molded from a heat curable aminoplast.

---

This is a continuation of our copending U.S. patent application Ser. No. 588,665, filed Sept. 30, 1966.

The present invention relates to novel diguanamine compounds and to aldehyde condensation products thereof. More particularly this invention relates to 1,4-bis-[2,6-diamino-s-triazinyl] - 1 - phenyl - 1,2,3,4 - tetrahydronaphthalene (for brevity, referred to hereinafter as atroponitrile dimer diguanamine) and related aromatic dicyano compounds, to a process for their preparation, and to aldehyde condensation products thereof.

The diguanamine compounds of the present invention when incorporated into a potentially heat-curable aminoplast give excellent stain resistance to molded articles.

The diguanamine compounds of the present invention may be prepared by reaction of cyanamide or dicyandiamide with various dinitriles. Some of the dinitriles are illustrated by the following:

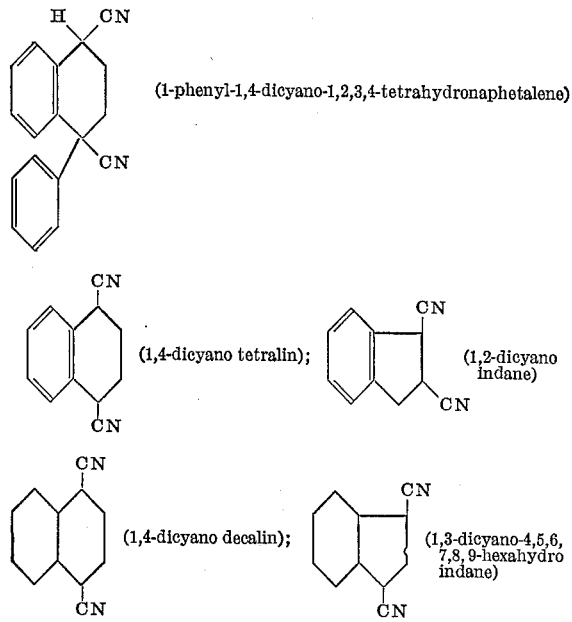

As cyanamide and dicyandiamide (along with most aromatic dinitriles) are normally solids at ambient conditions, their admixture and interaction are facilitated by the presence of a mutual solvent. Polar solvents are useful, particularly the hydroxylated lower boiling compounds, some of which are illustrated by the following: methyl Cellosolve, ethyl Cellosolve, propyl Cellosolve, ethylene carbonate, propylene carbonate, dioxane, dimethyl formamide, dimethyl acylamide, dimethylsulfoxide, butyrolactone, n-methyl pyrrolidone, etc.

The reaction between one of the aforementioned dinitriles and cyanamide or dicyandiamide, in one or more of the aforementioned solvents, may be advantageously carried out in the presence of a basic catalyst. Basic catalysts which are found useful are organic bases such as piperidine, pyrrolidine, di-(2-aminoethyl) amine and inorganic bases such as the alkali metal hydroxides and alkaline earth hydroxides. Preferred catalysts are potassium hydroxide and sodium hydroxide.

The above-mentioned dinitriles are commercially available in very limited quantities at this time, chiefly because of the generally unfavorable economics of their manufacture. Atroponitrile monomer, for example, a particularly desirable unsaturated dinitrile, was made by relatively an arduous process.

U.S. Pat. No. 2,362,049 discloses a method of preparing unsaturated nitriles containing an aromatic substituent in the alpha position by treating the corresponding aromatic methyl ketone with hydrogen cyanide, acetylating the cyanhydrin so formed, then deacetylating the acetate to produce the alpha aromatic substituted acrylonitrile.

U.S. Pat. No. 2,478,990 discloses the reaction between phenylacetonitrile and formaldehyde to form condensation products, and then these products are pyrolyzed to produce atroponitrile.

Copending U.S. patent application Ser. No. 423,818, filed Jan. 6, 1965, now U.S. Pat. No. 3,435,061, of R. K. Grasselli and J. L. Callahan, discloses a simple one-step process of catalytically converting α-methyl styrene to atroponitrile, making this process a key to the easy availability of atroponitrile monomer.

The step of converting the atroponitrile monomer to the dimer may be carried out at room temperature (about 25° C.) merely by letting it stand. The reaction may be accelerated by warming the monomer and decelerated by chilling. An unexpected feature of this step is that the dimerization occurs substantially quantitatively and no identifiable side products higher in molecular weight than the atroponitrile dimer were found. The dimerization reaction may be represented as follows:

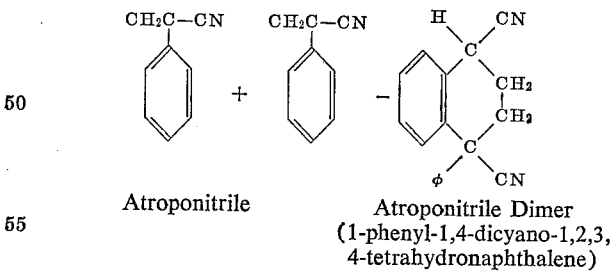

Atroponitrile        Atroponitrile Dimer
(1-phenyl-1,4-dicyano-1,2,3,4-tetrahydronaphthalene)

The value of atroponitrile dimer as a chemical intermediate is recognized in U.S. Pat. No. 2,478,900 which suggests it can be converted to a dibasic acid, a diamide and diamine for use in the synthesis of polyester and polyamide resins.

It is an object of this invention to produce a new compound, namely the diguanamine of 1-phenyl-1,4-dicyano-1,2,3,4-tetrahydronaphthalene, also called the diguanamine of atroponitrile dimer or atroponitrile dimer diguanamine.

A further obejct of the instant invention is to produce a highly stain resistant and extremely durable resin by incorporating the atroponitrile dimer diguanamine into "aminoplasts."

As is well known, aminoplasts are synthetic resins derived from amino (including imino) or amido (including imido) compounds, a typical example being urea-formaldehyde resin. In producing an aminoplast the choice of the aldehyde component is dependent largely upon economic considerations and upon the particular properties desired in the finished product. For general use, formaldehyde and compounds engendering formaldehyde, e.g., paraformaldehyde, hexamethylene tetramine, etc., are preferred. Other aldehydes which may be useful for specific applications are acetaldehyde, propionaldehyde, butyraldehyde, acrolein, methacrolein, crotonaldehyde, benzaldehyde, furfural, etc., mixtures thereof, or mixtures of formaldehyde with such aldehydes.

The amido, imido, amino or imino component may be, for instance, urea, thiourea, diurea, hydroxyurea, ethanol urea, unsymmetrical diphenyl urea, diethylene triurea, methyl urea, acetyl urea, benzoyl urea, phenyl thiourea, asymmetrical diethyl urea, allyl urea, 2-chloroallyl urea, ethylidene urea, methylene urea, methylol ureas, guanidine, dicyandiamide, cyanamide, guanyl urea, biguanidine, aminotriazines, aminodiazoles, etc. Generally the use of an aminotriazine, e.g., melamine, alone or in conjunction with other amido, amino, imido or imino compounds, is particularly advantageous. Other amino triazines containing at least one amino group are ammeline, ammelide, formoguanamine, 2-amino-1,3,5-triazine, melam, melon, 2,4,6-triethyltriamino-1,3,5-triazine and 2,4,6-triphenyl triamino-1,3,5-triazine.

For the purpose of the instant invention, "$NH_2$ equivalent" is defined as that number which corresponds to the number of $NH_2$ groups on a molecule; for example, melamine

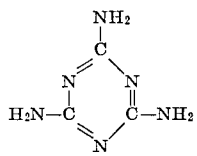

has an "$NH_2$ equivalent" of three (3); urea

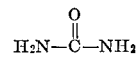

has an "$NH_2$ equivalent" of two (2).

It is known that various guanamines, and aliphatic guanamines in particular, are particularly useful as stain-inhibiting additives for melamine-formaldehyde resins. French Pat. No. 1,416,760, issued Sept. 27, 1965 and corresponding to U.S. patent application Ser. No. 328,110, now U.S. Pat. No. 3,288,902 describes the stain resistance of melamine-formaldehyde-aliphatic guanamine resins. Guanamines disclosed include adipoguanamine, succinoguanamine, glutaroguanamine, malonoguanamine, valeroguanamine, sebacoguanamine, pimeloguanamine, etc.

Also well known is the fact that benzoguanamine is a very useful stain-inhibitor for melamine-formaldehyde resins, as is disclosed in U.S. Pat. No. 2,579,985.

The copending patent application of J. L. Greene, F. Veatch and M. Godfrey, Ser. No. 384,547 filed July 22, 1964 and now U.S. Pat. No. 3,408,254, discloses the preparation of 2,2'(1,2-cyclobutylene)bis[4,6-diamine-s - triazine] by reacting mixed isomers of 1,2-dicyano-cyclobutane with cyanamide or dicyandiamide in the presence of ammonia.

The process of the present invention provides extremely stain-resistant resins by reacting the novel diguanamine compounds of the instant invention with aliphatic aldehydes, or with aminotriazines and aliphatic aldehydes. In particular, the resinous compound obtained by reacting atroponitrile dimer diguanamine with formaldehyde, and the resinous compound obtained by reacting atroponitrile dimer diguanamine with melamine and formaldehyde both compare very favorably with commercial resins.

It is within the scope of the instant invention to add minor amounts of other compounds to the above-mentioned resinous compounds. For example, various fillers may be added at any desired stage in the preparation of the resin. In addition, dyes, pigments, and optical brighteners may be incorporated into the resin. Similarly, minor amounts of flow agents may also be added to the resin.

The examples hereinafter describe in detail the preparation of the atroponitrile dimer diguanamine, its identification and its incorporation into melamineformaldehyde molding resins.

In the following examples, all "parts" refer to parts by weight unless otherwise specified.

EXAMPLE I 2 parts potassium hydroxide pellets (87.3% KOH) were dissolved in 31.5 parts of methyl Cellosolve in a jacketed vessel fitted with a mechanical stirrer and a reflux condenser. To this solution was added 20.2 parts of dicyandiamide and 25 parts atroponitrile dimer, stirring meanwhile. An orange-colored slurry resulted. The temperature of the solution was gradually increased to 65° C. when a white precipitate began to separate out of solution. The temperature was further increased to 100° C.; it was noted that during this temperature rise the white precipitate was being redissolved into the solution with a gradual change in color, till the solution turned dark red. At about this point an exothermic reaction occurred and the temperature rose to 145° C. The solution was cooled to 135° C. and refluxed at this temperature for 40 minutes. A pink-colored, crystalline solid separated out of the solution. 20 parts of methyl Cellosolve were added to the solution and the mixture further refluxed for an hour. The solution was then cooled and filtered.

The solid retained on the filter paper was purified by dissolving in a large volume of a hot 50–50 mixture of methyl Cellosolve and water. The solid dissolves with difficulty (about 1 part in 100 parts solvent mixture), and the temperature is maintained at about 80° C. till dissolution is complete. The solution is then cooled slowly by allowing it to stand at room temperature. White crystals precipitate out of solution. Upon filtering, the crystals are dried in an oven at 100° C.

The crystals melt at 286° C.–288° C. and the structure of the compound was confirmed by infrared analysis and nuclear magnetic resonance spectroscopy and believed to have the following structure:

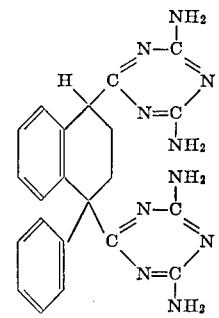

1,4 bis [2,6 diamino-s-triazinyl]-1 phenyl-1,2,3,4 tetrahydronaphthalene or 1,4 diguanamino-1 phenyl tetralin or astroponitrile dimer diguanamine

EXAMPLE II 2 parts sodium hydroxide pellets were dissolved in 38 parts of methyl Cellosolve in a jacketed vessel fitted with a mechanical stirrer and a reflux condenser. To this solution was added 43 parts of cyanamide and 25 parts of atroponitrile dimer stirring meanwhile. Subsequently, the same procedure as outlined above, was followed to yield white crystals of the diguanamine of atroponitrile dimer, confirmed by infrared analysis which indicated a structure identical with that of the compound of Example I.

The resins prepared as described in the following examples were formulated for the purpose of comparing their relative stain-resistant properties.

EXAMPLE III 1 mol of solid particulate melamine was mixed with 0.387 mol of solid particulate benzoguanamine in a flask. To this mixture was added 5 mols formaldehyde in the form of an aqueous solution at room temperature containing 36.6 wt. percent formaldehyde, the aqueous solution having been neutralized with NH₄OH to a pH of 7 just before it was used. The resulting solution was cloudy. Addition of an excess of about 0.5 mol formaldehyde in the aforementioned aqueous solution caused the cloudy solution to turn clear. The solution was then heated on a hot-water bath to drive off water slowly, whereupon the solution grew viscous. The flask was removed from the water bath and, upon cooling, part of the viscous solution was poured as a sheet on Raybrite-P (S-899) paper and part was poured as a sheet on aluminum foil. All samples were then cured at 325° F. (160° C.) for 4 minutes in a conventional oven. Tests for yellowness index were run on the samples poured on the Raybrite paper.

EXAMPLE IV 1 mol of solid particulate melamine was mixed with 0.333 mol of solid particulate atroponitrile dimer diguanamine (ATDIG) in a flask. To this mixture was added 5 mols formaldehyde in the form of an aqueous solution (36.6 wt. percent HCHO) at room temperature, the solution having been neutralized with ammonium hydroxide to a pH of 7 just before it was used. The mixture was heated on a hot plate and a further quantity of 0.8 mol of formaldehyde in aqueous solution was added to the flask. The mixture was maintained at 105° C. for 15 minutes when a clear yellow solution was formed. On continued warming on a hot-water bath to drive off water, the solution grew viscous. The flask was removed from the water bath and samples for testing were prepared as in preceding Example III.

It will be noted that in Examples III and IV above more than the theoretical requirement of formaldehyde was added to make up for the formaldehyde lost by evaporation during heating.

Samples of resin cured on the Raybrite-P paper were stained with commercial mustard, by allowing the mustard to dry overnight at room temperature, then washing it off with a hot detergent solution and rinsing. The stained samples were compared with unstained samples according to ASTM procedure D 1925-62 T which is a test for yellowness index of transparent and opaque plastics. The results of the tests indicate that ATDIG is a superior stain-inhibitor, better than benzoguanamine. Readings were obtained on a Hardy-G.E. type spectrophotometer. The higher the reading, the higher the yellowness of the sample. The difference in readings between stained and unstained samples is indicative of its stain resistance—the smaller the difference, the better the stain resistance.

TABLE.—YELLOWNESS INDEX TESTS [1]

| Mol ratio of resin constituents | Unstained | Stained | Difference |
| --- | --- | --- | --- |
| Melamine:benzoguanamine:HCHO=2.58:1:10.74 | −2.2 | 18 | 20.2 |
| Melamine:ATDIG:HCHO=3:1:13 | 8.3 | 19.4 | 11.1 |

[1] Yellowness Index Tests carried out as per ASTM designation: D 1925-62 T.
Yellowness Index=magnitude of yellowness relative to MgO.
Yellowness=deviation in chroma from whiteness in dominant λ of 570-575 mμ.

We claim:
1. A stain-resistant and abrasion-resistant resin obtained by the polymerization reaction of one molar part by weight of the compound 1,4-bis-[2,6-diamino-s-triazinyl]-1-phenyl - 1,2,3,4 - tetrahydronaphthalene represented by the structure:

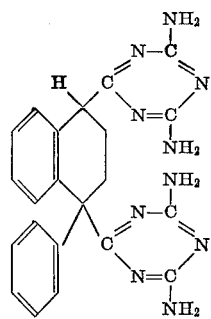

with 3 molar parts by weight of melamine and 15–18 molar parts by weight of formaldehyde at a temperature of at least about 100° C.

References Cited

UNITED STATES PATENTS

| | | | |
| --- | --- | --- | --- |
| 2,423,071 | 6/1949 | Thurston | 260—67.6C |
| 2,478,990 | 8/1949 | Walker | 260—465 |
| 3,379,661 | 4/1968 | Glynn | 260—67.6 |
| 3,454,529 | 7/1969 | Casebolt | 260—67.6 |

HAROLD D. ANDERSON, Primary Examiner

R. J. KOCH, Assistant Examiner

U.S. Cl. X.R.
260—39